United States Patent
Colline et al.

(10) Patent No.: US 11,803,468 B2
(45) Date of Patent: Oct. 31, 2023

(54) DATA STORAGE SYSTEM WITH WRITE BACK CACHE

(71) Applicant: Seagate Technology LLC, Cupertino, CA (US)

(72) Inventors: Phillip R. Colline, Tustin, CA (US); Michael Barrell, Longmont, CO (US); Richard O. Weiss, Superior, CO (US); Mohamad H. El-Batal, Superior, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/135,576

(22) Filed: Sep. 19, 2018

(65) Prior Publication Data
US 2020/0089609 A1    Mar. 19, 2020

(51) Int. Cl.
| G06F 12/00 | (2006.01) |
| G06F 12/0804 | (2016.01) |
| G06F 13/16 | (2006.01) |
| G06F 13/42 | (2006.01) |

(52) U.S. Cl.
CPC ...... *G06F 12/0804* (2013.01); *G06F 13/1668* (2013.01); *G06F 13/4282* (2013.01); *G06F 2212/1032* (2013.01); *G06F 2213/0026* (2013.01)

(58) Field of Classification Search
CPC ............. G06F 12/0804; G06F 13/1668; G06F 13/4282; G06F 2212/1032; G06F 2213/0026
See application file for complete search history.

(56) References Cited

U.S. PATENT DOCUMENTS

| 5,420,998 | A | * | 5/1995 | Horning | G06F 3/0613 711/113 |
| 5,586,291 | A | * | 12/1996 | Lasker | G06F 11/1435 711/113 |
| 5,694,567 | A | * | 12/1997 | Bourekas | G06F 12/0864 711/202 |
| 5,903,911 | A | * | 5/1999 | Gaskins | G06F 12/0862 711/133 |
| 6,148,368 | A | | 11/2000 | DeKoning | |
| 6,282,604 | B1 | * | 8/2001 | May | G06F 12/0215 711/3 |
| 9,565,269 | B2 | | 2/2017 | Malwankar et al. | |
| 9,712,619 | B2 | | 7/2017 | Malwankar et al. | |
| 9,720,603 | B1 | * | 8/2017 | Salazar | G06F 12/0813 |

(Continued)

*Primary Examiner* — John A Lane
(74) *Attorney, Agent, or Firm* — Hall Estill Law Firm; Randall K. McCarthy

(57) ABSTRACT

A data storage system can have one or more hosts connected to a data storage subsystem with the host having a host processor and the data storage subsystem having a controller. Write back data generated at the host triggers the host processor to allocate a cache location in the data storage subsystem where the generated data is subsequently stored. The generated write back data is written in a non-volatile destination address as directed by the controller prior to waiting for a secondary event with the generated data stored in both the cache location and the non-volatile destination address. Detection of the secondary event prompts the controller to signal the host processor that the cache location is free for new data.

20 Claims, 4 Drawing Sheets

(56) References Cited

U.S. PATENT DOCUMENTS

| | | | |
|---|---|---|---|
| 9,721,660 B2 | 8/2017 | Kelly et al. | |
| 9,727,454 B2 | 8/2017 | Kuzmin et al. | |
| 2008/0046679 A1* | 2/2008 | Bennett | G06F 12/1054 |
| | | | 711/207 |
| 2014/0082276 A1* | 3/2014 | Suzuki | G06F 11/3485 |
| | | | 711/113 |
| 2014/0195480 A1 | 7/2014 | Talagala et al. | |
| 2015/0261674 A1* | 9/2015 | Wei | G06F 12/0866 |
| | | | 711/135 |
| 2017/0068456 A1* | 3/2017 | Toge | G06F 3/0605 |
| 2017/0075591 A1 | 3/2017 | Espeseth et al. | |
| 2018/0039412 A1 | 2/2018 | Singh et al. | |
| 2019/0303041 A1* | 10/2019 | Kim | G06F 3/0679 |

\* cited by examiner

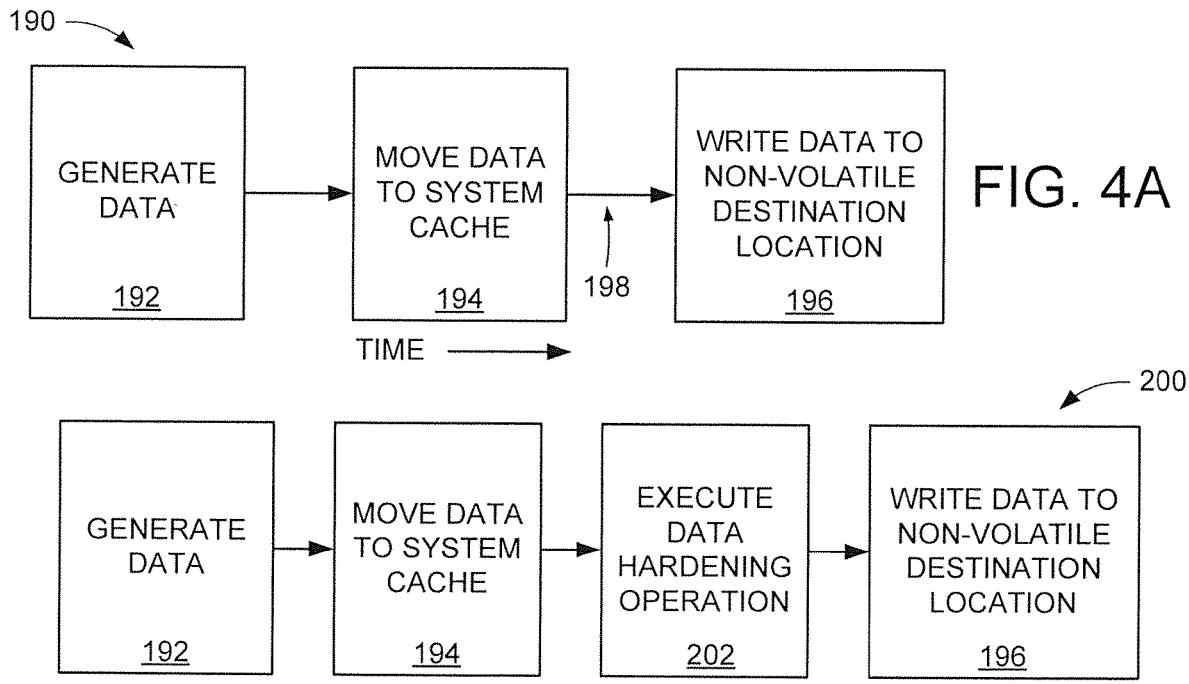
FIG. 4A
FIG. 4B
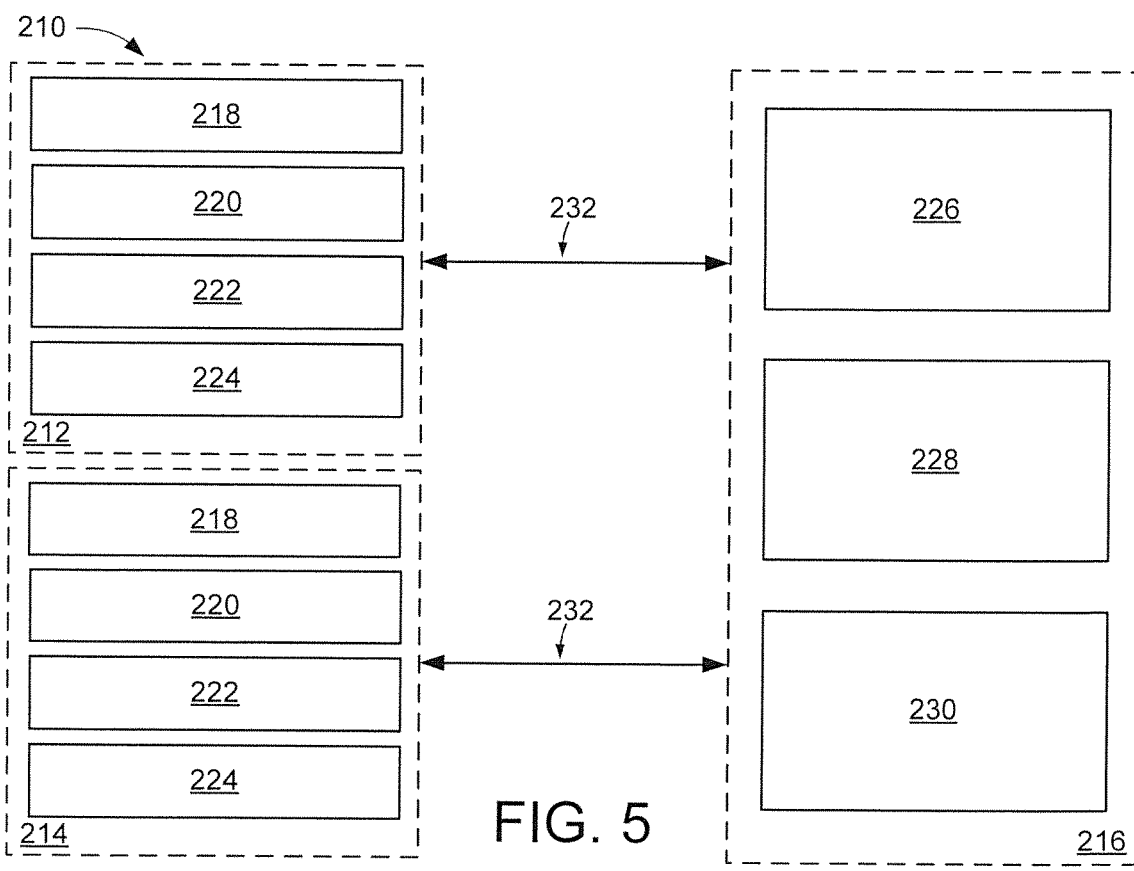
FIG. 5

DATA STORAGE SYSTEM WITH WRITE BACK CACHE

SUMMARY

A data storage system, in accordance with some embodiments, has a host connected to a data storage subsystem with the host having a host processor and the data storage subsystem having a controller. Write back data generated at the host triggers the host processor to allocate a cache location in the data storage subsystem where the generated write back data is subsequently stored. The generated write back data is written in a non-volatile destination address as directed by the controller prior to waiting for a secondary event with the generated data stored in both the cache location and the non-volatile destination address. Detection of the secondary event prompts the controller to signal the host processor that the cache location is free for new data.

Various embodiments arrange a data storage system with a host connected to a data storage subsystem where the host has a host processor configured to generate a write command and allocate a cache location for write back data. The data storage subsystem has a controller configured to complete the write command and wait for a secondary event prior to signaling the host processor the cache location is free for new data.

In other embodiments, a data storage system has a host connected to a data storage subsystem with the host having a host processor and the data storage subsystem having a controller. Write back data generated at the host triggers the host processor to allocate a first cache location in the data storage subsystem where the generated write back data is subsequently stored. The write back data is mirrored to a second cache location before being written in a non-volatile destination address as directed by the controller. The controller waits for a secondary event with the generated write back data stored in both the cache location and the non-volatile destination address. Detection of the secondary event prompts the controller to signal the host processor that the cache location is free for new data.

BRIEF DESCRIPTION OF THE DRAWINGS

FIGS. 4A & 4B respectively convey timelines of example operations that can be performed by a data storage system in accordance with some embodiments.

FIG. 5 illustrates a block representation of portions of an example data storage system arranged in accordance with various embodiments.

DETAILED DESCRIPTION

The present disclosure is generally directed to a data storage system with a non-volatile write back cache configured to optimize at least data write performance.

As computing systems become more sophisticated and widely utilized for the generation, and transfer, of data, the speed, efficiency, and integrity of data storage is emphasized. The storage of data can be generated faster than a data storage system can reliably write data to a permanent destination. Hence, caching of data and information associated with the data, such as metadata, error correction, tables, and maps, to a temporary location can provide increase data storage performance.

However, the proliferation of relatively large numbers of remote hosts concurrently sending data to a centralized data storage destination has stressed conventional data caching methodology to the point where the caching data is a bottleneck compared to the organization or actual execution of data storage. The caching of write back data, in particular, is a data storage performance bottleneck as data hardening operations are conducted to ensure data can survive an unexpected loss of electrical power while data is stored in a temporary cache location.

Accordingly, assorted embodiments provide a data storage system with robust caching that can provide optimized data storage performance that can survive unexpected losses in electrical power. By utilizing the intelligence of a data storage system, instead of remote hosts, to direct caching operations, data from multiple different hosts can be efficiently managed without jeopardizing the integrity of the data itself. The removal of data caching operations from remote hosts allows for centralized data management by a data storage system that leverages hardware accelerations to move data and associated data information, into, and out of, one or more permanent data storage destinations.

Figure 1:
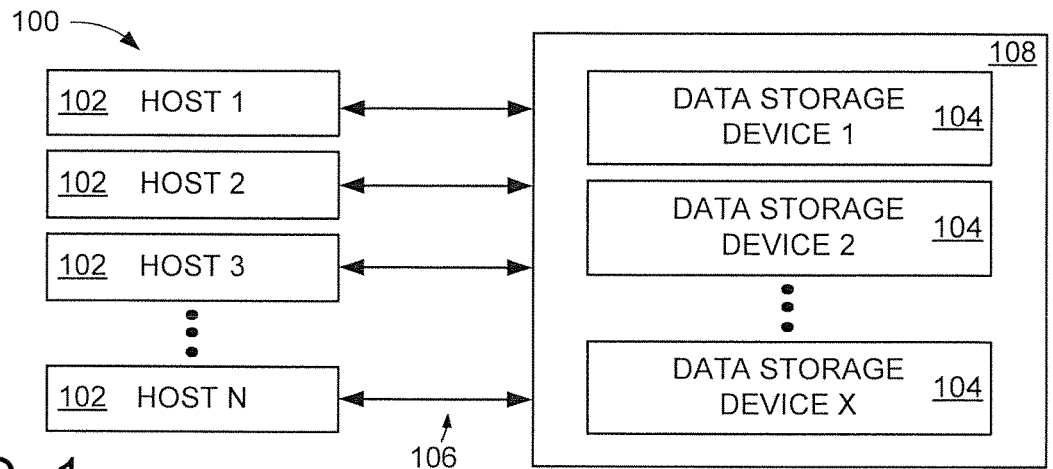
FIG. 1 is a block representation of a portion of an example distributed data network arranged in accordance with various embodiments.

FIG. 1 represents an example distributed data storage network 100 in which various embodiments can be practiced. The network 100 can have any number (N) of remote hosts 102 connected to one or more data storage devices 104 via wired and/or wireless interconnections 106. The data storage devices 104 can be physically, and/or logically, grouped into a data storage system 108 that operates remotely from the respective hosts 102 to conduct data storage and retrieval. In some embodiments, multiple data storage devices 104 may be physically packaged in a common enclosure that is mounted in a storage rack at a single location. In other embodiments, data storage devices 104 are physically separated in different locations, such as different cities, states, countries, or hemispheres. Regardless of where the data storage devices 104 are physically located, the storage of data from multiple different hosts 102 can present situations that challenge the performance of the network 100. For example, in virtualized environments, such as when a host 102 is operating as a virtual machine or executing an application container, data can be quickly generated and sent to the data storage system 108 to be written.

The volume of data, and corresponding data information, sent from multiple hosts 102 can stress the ability of the system 108 to organize and execute data writes, data reads, and data maintenance. In response, data can be temporarily stored in the respective hosts 102 until a data storage device 104 is available to write the data into the data storage system 108. However, the storage of data in the respective hosts 102 can create data storage performance bottlenecks with organizing and scheduling data storage device 104 activity from multiple different sources. Hence, various embodiments are directed to optimizing the data storage system 108 by employing a non-volatile cache that can store to-be-written data logically and physically closer to the data storage devices 104.

Figure 2:
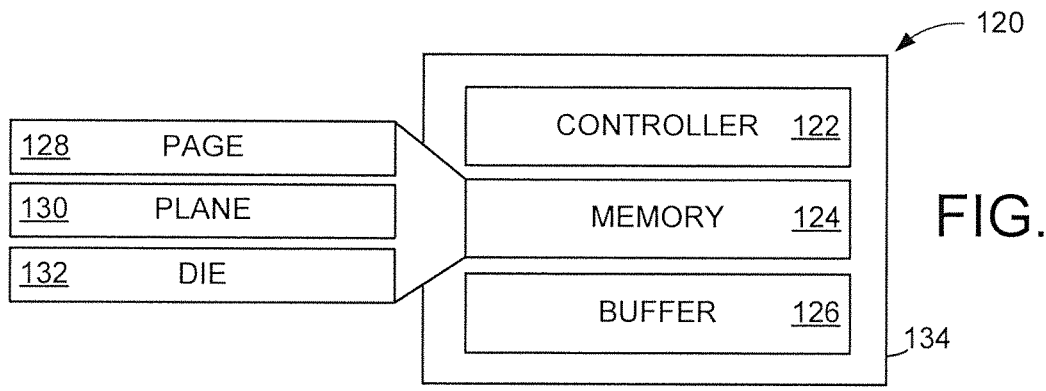
FIG. 2 displays a block representation of portions of an example data device that can be utilized in the network of FIG. 1 in assorted embodiments.

FIG. 2 displays a block representation of an example data storage device 120 that can be utilized in a data storage system and data storage network in accordance with assorted embodiments. A data storage device 120 can employ one or more local controllers 122, such as a microprocessor or other programmable circuitry, that directs data storage operations of a memory 124. Such data storage operations can be, but are not limited to, scheduling, packaging, organizing, writing, reading, and generating data information corresponding with host-generated data.

A controller 122 can also direct operations of at least one buffer 126 where data, and corresponding data information, is temporarily stored to complement operation of the memory 124. It is contemplated, but not required, that the memory 124 is a non-volatile type of data storage that stores data in a tangible medium. For example, the memory 124 may utilize rotating magnetic media to store data. In other non-limiting embodiments, the memory 124 may utilize solid-state memory cells arranged into pages 128, planes 130, and die 132. As shown, the various constituent components of the data storage device 120 can be commonly packaged within a single housing 134, such as a sealed, or unsealed, physical container.

The availability of the buffer 126 allows the data storage device 120 to temporarily hold data, and corresponding data information, until the memory 124 is ready to execute a data access operation to write and/or read data. However, a non-volatile buffer 126 can be susceptible to data loss as a result of an electrical power interruption. The buffer 126 may additionally suffer from a lack of accessibility by remote hosts. For instance, a remote host may not be able to directly access and store data in the buffer 126, which requires the remote host to store data while the local device controller 122 is engaged to conduct data transfer to the device buffer 126. These additional steps introduce latency and complexity into data storage in the device 120 from a single host and is compounded when multiple remote hosts vie for the processing power, and time, of the device controller 122.

Figure 3:
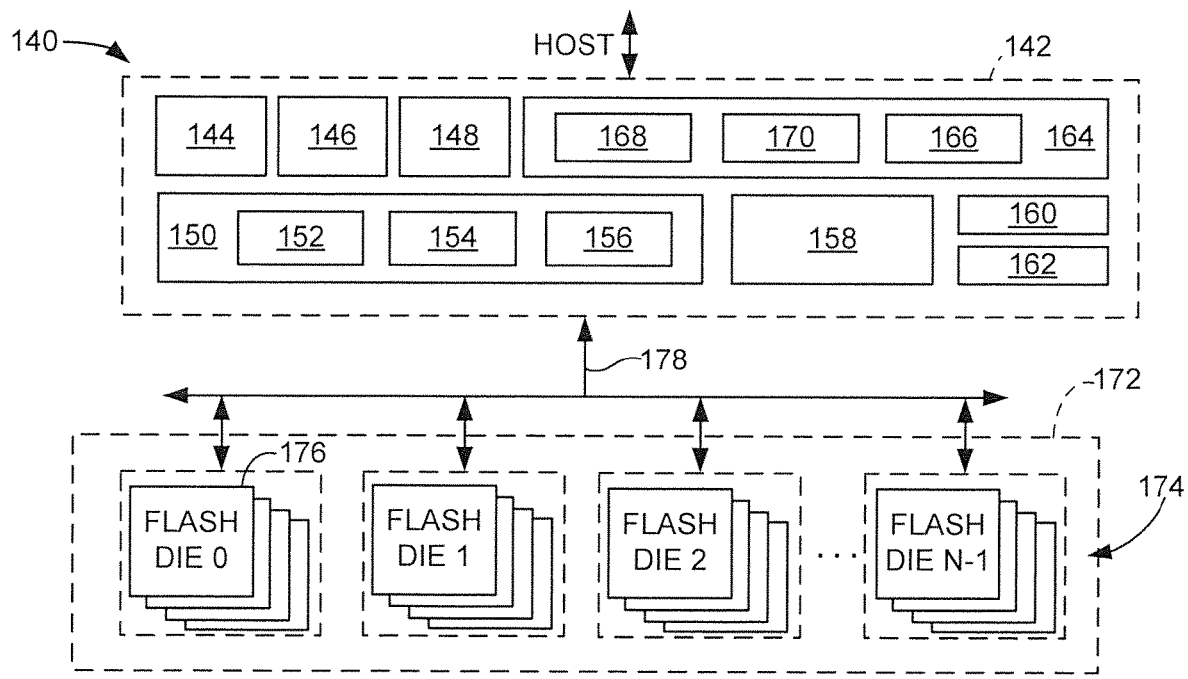
FIG. 3 represents portions of an example data storage system that may be utilized in various embodiments.

FIG. 3 displays portions an example data storage device 140 generally corresponding to the device 120 in FIG. 2. The device 140 is configured as a solid state drive (SSD) that communicates with one or more host devices via one or more Peripheral Component Interface Express (PCIe) ports, although other configurations can be used. The SSD is contemplated as comprising NAND flash memory, although other forms of solid state non-volatile memory can be used.

In at least some embodiments, the SSD operates in accordance with the NVMe (Non-Volatile Memory Express) Standard, which enables different users to allocate die sets for use in the storage of data. Each die set may form a portion of an NVMe Namespace that may span multiple SSDs or be contained within a single SSD. The data storage device 140 has a controller circuit 142 with a front end controller 144, a core controller 146 and a back end controller 148. The front end controller 144 performs host I/F functions, the back end controller 148 directs data transfers with the memory module 144 and the core controller 146 provides top level control for the device.

Each controller 144, 146 and 148 has a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 150 represents various forms of volatile and/or non-volatile memory (e.g., SRAM, DDR DRAM, flash, etc.) utilized as local memory by the controller 142. Various data structures and data sets may be stored by the memory including one or more map structures 152, one or more caches 154 for map data and other control information, and one or more data buffers 156 for the temporary storage of host (user) data during data transfers.

A non-processor based hardware assist circuit 158 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 142, such as a data compression block 160 and an encryption block 162. The data compression block 160 applies lossless data compression to input data sets during write operations, and subsequently provides data de-compression during read operations. The encryption block 162 provides any number of cryptographic functions to input data including encryption, hashes, decompression, etc.

A device management module (DMM) 164 supports back end processing operations and may include an outer code engine circuit 166 to generate outer code, a device I/F logic circuit 168 and a low density parity check (LDPC) circuit 170 configured to generate LDPC codes as part of the error detection and correction strategy used to protect the data stored by the by the data storage device 140. A memory module 172 corresponds to the memory 124 in FIG. 2 and comprises a non-volatile memory (NVM) in the form of a flash memory 174 distributed across a plural number N of flash memory dies 176. Rudimentary flash memory control electronics (not separately shown in FIG. 3) may be provisioned on each die 176 to facilitate parallel data transfer operations via one or more channels (lanes) 178.

FIGS. 4A and 4B respectively depict timelines of operations that can be undertaken by components of a data storage system in some embodiments. Timeline 190 of FIG. 4A shows how data can originate in a host in step 192 and subsequently be moved to a system cache in step 194, such as the device buffer 126 of FIG. 2 and/or a memory resident in the remote host. While the data is stored in the cache prior to being written to a non-volatile destination, such as memory 124 of FIG. 2, in step 196 a power event 198 can occur that deactivates the cache and causes all previously stored data in the cache to be lost, which results in decreased system data storage performance as the cache is repopulated and pending data accesses from various remote hosts are delayed.

The timeline 200 of FIG. 4B begins similarly to timeline 190 with data being generated by a remote host and then stored in at least one cache memory location. A data hardening operation is conducted in step 202 that prevents the loss of the cached data to an unscheduled electrical power loss. Such data hardening operation is not limited to a particular process, but can involve copying the cached data to a non-volatile memory location, charging an electrical capacitor connected to a volatile cache memory, or mapping the cached data in a format that allows for efficient rebuilding of the cache one deactivated.

Once the cached data is hardened, the data can flow to the destination address in step 196 from any location within the data storage system. While the hardening of cached data can resist electrical power interruptions, the hardening process of step 202 can introduce data storage latency and complexity as cached data is stored and maintained until both the destination address is ready to receive data and the data has successfully been hardened. The latency and jeopardy to data storage system performance can be particularly apparent when write back data is employed, which can be characterized as caching each update to data resident in non-volatile memory and subsequently flushing the cached updates when predetermined conditions are met, such as local controller processing capacity, electrical power usage, priority of data, or amount of data stored in cache memory.

FIG. 5 illustrates a block representation of portions of an example data storage system 210 where assorted embodiments can be conducted. The data storage system 210 has a first host 212 and a second host 214 each connected to a centralized data storage subsystem 216 as part of a distributed data storage network. It is contemplated that the remote hosts 212/214 can be configured differently from each other, and from the subsystem 216, while being physically positioned in different cities. It is also contemplated that the remote hosts 212/214 are each physically positioned in a common enclosure, rack, or housing as the subsystem 216.

In the non-limiting example shown in FIG. 5, each remote host, or external system, 212/214 has a host, or external, processor 218, which may be a hardware processor in some embodiments, that directs operation of at least a logical device interface 220, an object interface 222, and a host memory 224. The logical device interface 220 may employ a NVMe over fabrics (NVMeoF) protocol that utilizes the NVMe protocol over a network of interconnected data storage components. The logical device interface 220 may employ any kind of data transport means, such as remote direct memory access (RDMA) and/or fibre channel (FC-NVMe), to move data to the host memory 224 from a data origination, such as a user or the host itself.

The object interface 222 can complement the logical device interface 220 by allowing virtualization and other system architectural organizations to streamline the movement of data to the host 212/214. With generated data stored in the host memory 224, the host processor 218 issues a data access command, such as an NVMe command, to the subsystem 216 with one or more pointers, such as a physical region page (PRP) and/or scatter gather lists (SGL), leading to the data resident in the host memory 224.

A storage controller 226 of the subsystem 216, which may be an NVMe-specific processor, can then move data from the host memory 224 to a subsystem cache 228 with involvement of software executed by the controller 226. It is contemplated that such data movement can involve RDMA transport means. Upon completion of the data move to the subsystem cache 228, the host memory 224 is freed, which can involve erasing the memory 224 or simply identifying existing data addresses as open for new data.

At some point after data is accumulated in the subsystem cache 228, the subsystem controller 226 flushes the data to various non-volatile data storage device destinations 230, such as rotating magnetic media and/or SSDs. Flushing data to the non-volatile device(s) 230 triggers the cache memory 228 to be freed of the previously written data. It is noted that flushing data can involve writing, reading, moving, and/or mirroring operations. The concurrent flushing of data to the non-volatile destination(s) 230 and freeing the subsystem cache 228 provides efficient data movement that does not limit the bandwidth of the system 210. The use of efficient interconnections 232 between the hosts 212/214 and the subsystem 216, such as with peripheral component interconnect express (PCIe) serial standard, allows for the NVMe protocol to be used by the subsystem controller 226 to leverage hardware acceleration to reduce data access command execution latency. However, the copying of data to the cache memory 226 with the involvement of software can increase data access command execution latency and the storage of data in the host memory 224 can place a burden on the host that translates to increased complexity and data movement time.

Figure 6:
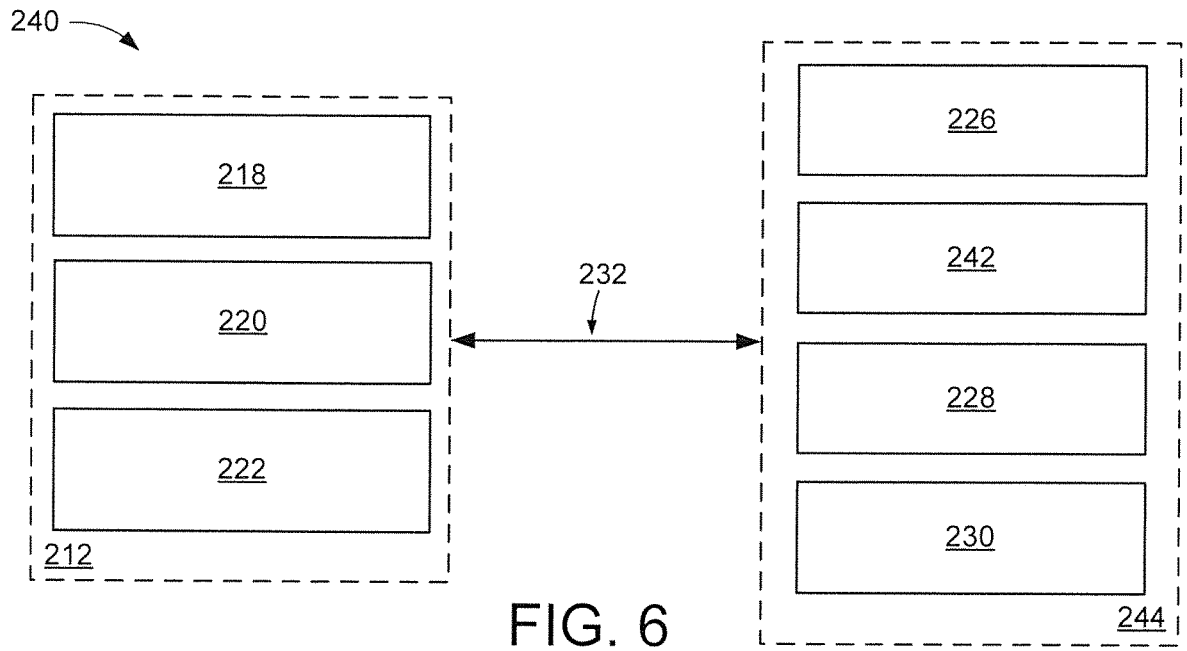
FIG. 6 shows a block representation of portions of an example data storage system configured in accordance with some embodiments.

Hence, some embodiments utilize a controller memory buffer (CMB) to mitigate the deficiencies of the data storage system shown in FIG. 5. The example data storage system 240 shown in FIG. 6 displays, in functional block form, how a CMB 242 can be implemented in accordance with various embodiments. Upon receipt of a data write command the host processor 218 allocates memory from the CMB and directs data movement to the allocated location over the system interconnections 232 without storing the data in any memory of the host 212.

The host processor 218 can then issue a write data access command to the subsystem controller 226 pointing to the data already resident in the CMB memory 242. Instead of having data movement from the host memory 224 to the subsystem cache memory 228, as conveyed in FIG. 5, storage of data in the CMB allows the data to efficiently be copied to the cache memory 228 as directed by the subsystem controller 226. Completion of the data copy operation to the cache memory 228 allows the controller 226 to free the CMB 242 for input of new data. The ability to efficiently copy data from the CMB instead of from host memory 218 reduces data access latency and removes the need for host memory 218, but can increase complexity due to the CMB-to-cache copy.

Once the data is resident in the cache memory 228, the subsystem controller 228 subsequently flushes the data to one or more destination addresses 230 and immediately frees the cache memory 228 for new data from the CMB 242. It is noted that the flushing of data from the cache memory 228 to the destination addresses 230 triggers the cache memory 228 to be free for new data without a separate command to free the cache memory 228 from the local controller 226 or remote host 212. That is, a single command from the local controller 226 to flush data to the destination addresses 230 of one or more data storage devices and frees the addresses of the data in cache memory 228 for new data.

It is contemplated that the CMB memory 242 is volatile or non-volatile, such as a persistent memory region (PMR), but the use of a non-volatile CMB memory 242 can increase latency as volatile memories tend to have faster data access times than non-volatile memories. Similarly, the cache memory 228 can be volatile or non-volatile type of memory. The ability to configure the CMB 242 and cache 228 memories as different types of memory with dissimilar data access speeds, capacities, and physical sizes on a printed circuit board of the storage subsystem 244.

By configuring the cache memory 228 as non-volatile storage, the moving of data from the CMB 242 acts as a hardening operation against unscheduled electrical power loss. However, such activity expends processing and time to write data to the destination addresses 230. In addition, the processing and channel bandwidth of the data storage subsystem 244 is reduced during the copying operation from the CMB 242 to the cache memory 228.

Figure 7:
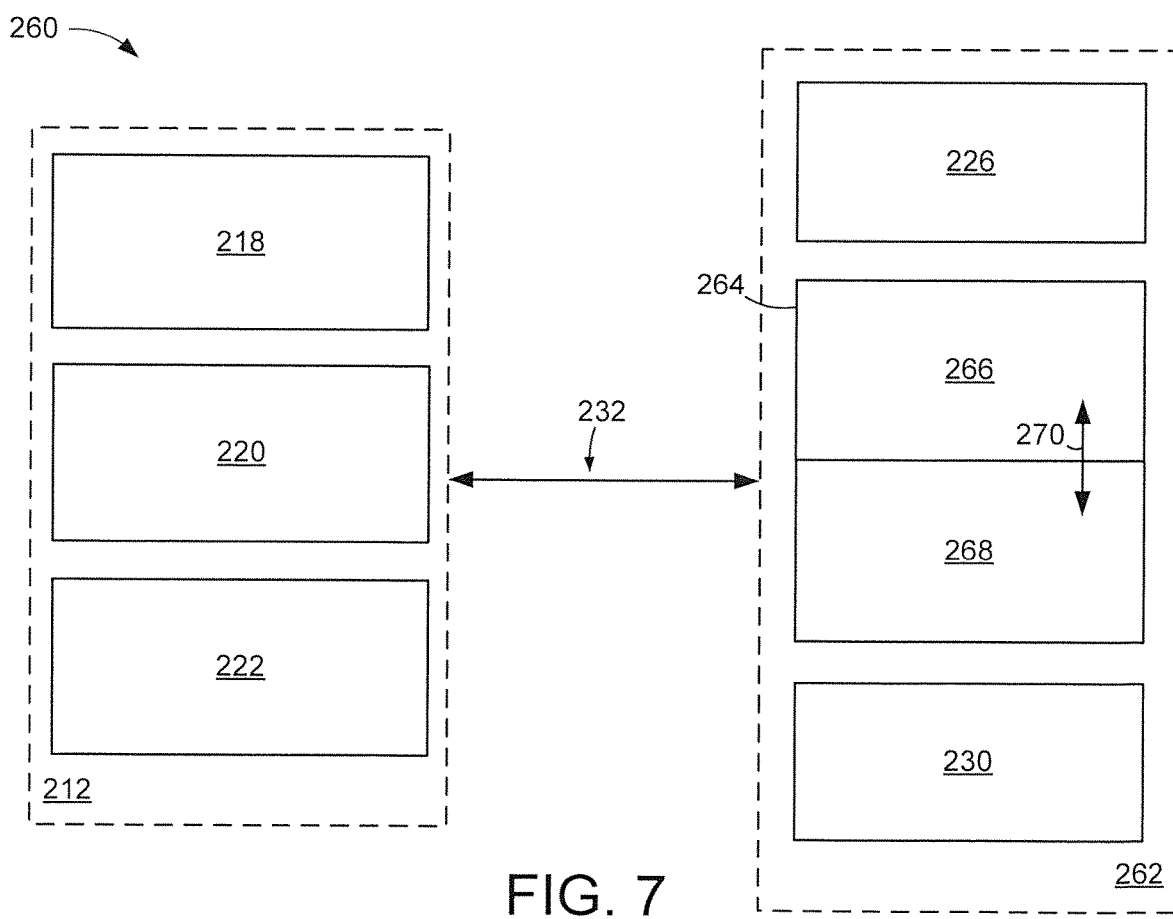
FIG. 7 depicts a block representation of portions of an example data storage system constructed and operated in accordance with assorted embodiments.

FIG. 7 represents a portion of an example data storage system 260 configured to carry out various embodiments that optimize writing data, such as write back data, into a non-volatile destination memory 230 as part of a distributed data storage network where data is generated by one or more remote hosts. The system 260 can connect any number of different hosts 212 to a data storage subsystem 262 via PCIe interconnections 232 that allow the subsystem controller 226 to execute NVMe protocol for the transfer of data through the host 212 without storing data in the host 212.

Upon a data storage command receipt, the host processor 218 allocates memory in the non-volatile cache 264 over the PCIe interconnection 232. It is noted that the host processor 218 can execute RDMA and/or FC-NVMe to allocate and send data from an originating host to the non-volatile cache 264. The non-volatile cache 264 can be configured as a single memory space, such as a namespace, die, die set, or array, which acts similarly to the CMB 242 of FIG. 6 without requiring a separate copying operation to harden stored data.

The host processor 218 hands off the data write command to the subsystem controller 226 with one or more pointers referencing the non-volatile cache location allocated for the data of the write command by the host processor 218. The storage of data in the non-volatile cache 264 triggers the host processor 218 to release the host interface(s) 220/222 for new data, commands, objects, and data information. By releasing the host 212 once the data is stored in the non-volatile cache 264, the host 212 can service additional data access commands, such as data reads, data maintenance like garbage collection, and new data writes, prior to data being stored in the non-volatile destination 230 of the subsystem 262.

At some point after write data has been stored in the non-volatile cache 264, such as in response to a predetermined trigger like a particular volume of data being present, data being present in the cache for a particular amount of time, or a particular number of updates to data resident in the cache, the subsystem controller 226 beings copying at least a portion of the cached data to the assigned destination addresses 230 without alerting the host 212. That is, the subsystem controller 226 satisfies preexisting data write command(s) for at least some of the data resident in the cache 264 without sending a completion command, or other signal, to the host 212 to free the cache 264 for new data, which maintains the cached data until a secondary event, such as an out-of-band handshake or verified successful writing of all data resident in the cache 264 to the destination addresses 230, is encountered.

The separation of the completion of data writing command(s) and signaling the host 212 that the cache 264 is free for new data allows data to remain in the non-volatile cache 264 until one or more secondary events trigger the cache 264 to be freed optimizes data storage efficiency as new data is not sent to the cache 264 until operationally efficient, as indicated by the secondary event. It is contemplated that the secondary event is a data maintenance operation to the destination memory, such as garbage collections, read refreshes, or firmware updates. The ability to customize the secondary event allows the subsystem controller 226 to intelligently cater caching configurations to balance data input from one or more hosts 212/214, the data storage performance of the destination addresses 230, and integrity of cached data to provide, and maintain, high data storage performance despite changing system conditions, such as priority of write data, size of write data, and rate of incoming write data.

In some embodiments, the cache 264 consists of a volatile memory portion 266 and a non-volatile portion 268 that receives a mirror operation for data, as represented by arrow 270, upon reception of data into the cache 264. The availability of the volatile portion 266 can provide faster data throughput and transfer capabilities while the non-volatile portion 268 provides data hardening against unscheduled power loss without occupying expensive processing and time associated with a copying operation, as discussed with FIG. 6.

The use of a non-volatile memory for caching allows bandwidth to not be limited and leverages hardware accelerated by the subsystem controller 226 to reduce data writing latency. The separation of data write command execution to the destination addresses 230 from the signaling of the host 212 that the cache is free for new data allows one or more secondary data storage subsystem 262 operation events to successfully occur before the cached data is lost and/or the cache 264 is not optimally configured for new data.

Figure 8:
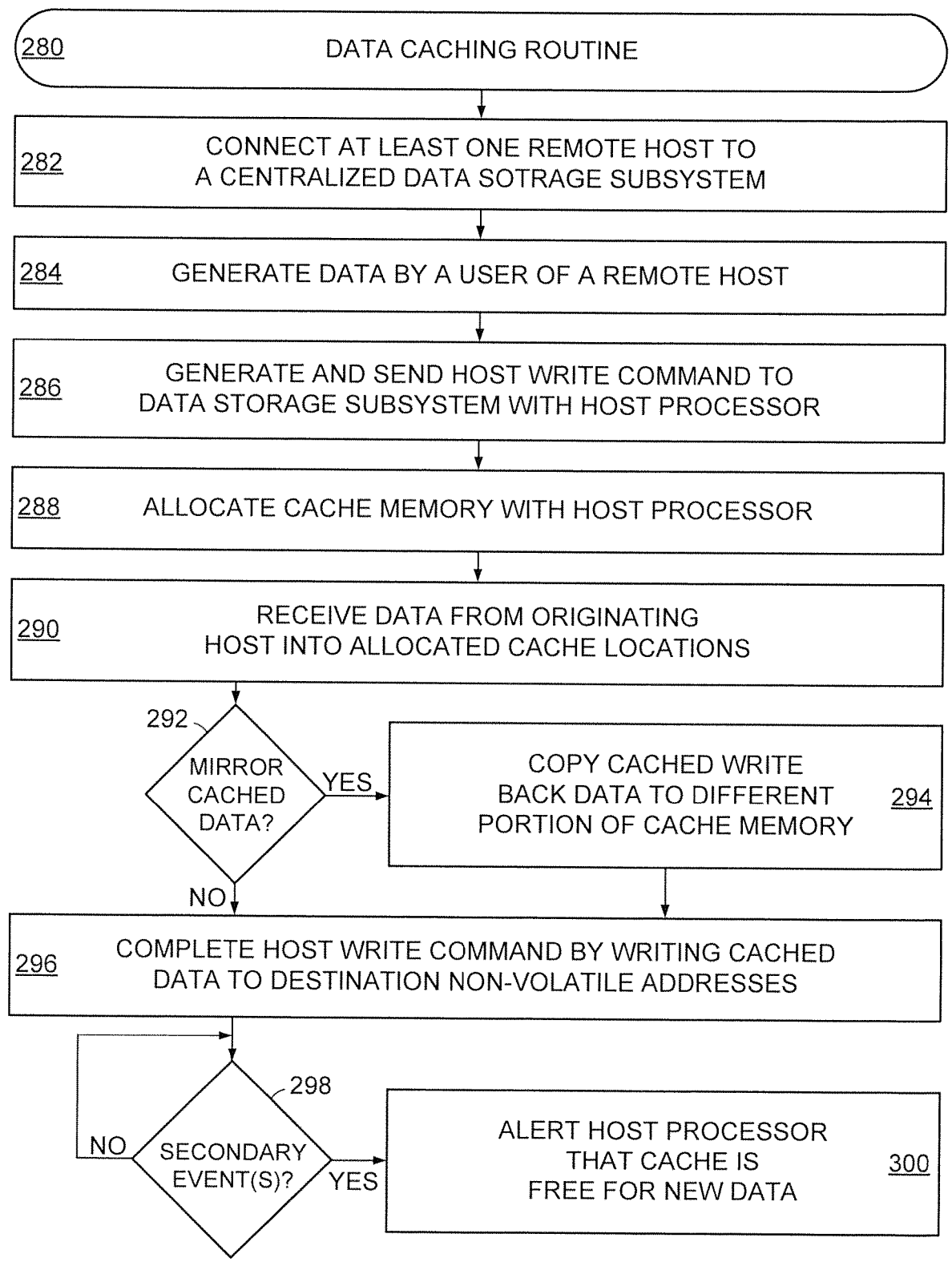
FIG. 8 provides an example caching routine that may be carried out with the assorted embodiments of FIGS. 1-7.

The example data caching routine 280 shown in FIG. 8 conveys how a data storage system can be utilized to optimize data storage performance, particularly write latency of write back data. A data storage system is arranged in step 282 so that at least one remote host is connected to a centralized data storage subsystem, as generally illustrated in FIG. 7. It is contemplated that any number of remote hosts can concurrently, or individually, be connected to a centralized data storage subsystem from different physical locations, such as different cities or countries.

At some point, data is generated by a user in step 284, which can be a human engaging a host in some embodiments. The generated data prompts a host processor of a remote host to generate and send a host write command to the data storage subsystem in step 286. The host processor also allocates cache memory in a subsystem cache in step 288. It is contemplated that the host processor allocates a non-volatile cache location, such as a CMB or PMR, directly via RMDA without accessing the local subsystem controller.

The cache memory allocation of step 288 can consist of assigning logical and/or physical block addresses for the write data to be programmed to the subsystem, generating any information associated with the write data, such as metadata and/or error correction, and assigning cache locations for such generated data information. It is noted that the allocation of memory in step 288 may also consist of assigning final destination logical block addresses for the write data. By utilizing the host processor, and not the local subsystem controller, the data storage subsystem can concurrently handle relatively large volumes of incoming write data quickly and reduced data storage latency compared to if the subsystem controller were involved with directing some, or all, of the caching of write data.

The allocated cache memory locations are then utilized in step 290 as write data is received from the originating host. The write data resident in the cache memory can be characterized as write back data because data is stored in the cache every time there is an update to the corresponding data resident in long-term non-volatile data storage locations of the data storage subsystem. The cached data may have one or more forward pointers identifying the cached version of data, instead of a version stored in long-term non-volatile memory, so that a data read will return the data resident in cache to ensure the most up-to-date version of data is provided in response to a data read request from one or more remote hosts.

In some embodiments, the cached data is mirrored to a separate portion of subsystem memory. Decision 292 determines if a mirroring operation is to be completed. If so, step 294 copies the cached write back data to a different portion of cache memory. Such mirroring acts as a data hardening operation and can correspond with a portion of the subsystem cache memory being volatile and therefore susceptible to unscheduled power loss. It is contemplated that the mirroring of step 294 can be done passively and without prior prompting by a remote host or local subsystem controller or done actively and only after a mirror signal from the local subsystem controller.

In the event no mirroring operation is conducted passively, or actively, at some time step 296 completes the host write command by writing the cached data, and any associated data information, to one or more non-volatile long-term data storage destination addresses. The successful writing of data to long-term destination in step 296 effectively ends the need for the cached data. However, various events, such as power loss, errors, faults, and failures, can prevent the cached data from properly being written to the assigned destination. As such, the cached data is retained after the write data is present in the long-term destination until one or more secondary events occur.

Decision 298 continuously, or sporadically, evaluates if the predetermined secondary event(s) have occurred. The secondary events can be customized by the local subsystem controller to cater to the real-time, or predicted future, data storage environment. For example, a secondary event can be changed from an out-of-band handshake occurrence to the passage of a time interval, like 10 ns, if data volume into the subsystem is slow or is predicted to increase or if higher than normal security levels that require additional writing time are actually, or expected, to be queued for storage. As another non-limiting example, a secondary event can be customized to require multiple different conditions, such as a predetermined volume of data being written to the long-term destinations and the cache being less than half full of current write back data. In yet another example, a secondary event can be configured as the cache being more than half full of current write back data to provide greater processing capabilities to service priority data read requests, such as during an I/O deterministic window.

Once the customized secondary event(s) have been detected by decision 298, step 300 proceeds to alter the host processor that the previously occupied cache locations are free to receive new data. Step 300 may consist of clearing some, or all, of the cache via an erase operation or designating portions of the cache available for new data. It is noted that the various aspects of routine 280 are not required, or limiting, and can be changed without deterring from the optimization of data management by intelligently utilizing a CMB, or PMR, as a temporal non-volatile cache.

Through the assorted embodiments illustrated and discussed in FIGS. 1-8, write latency of write back data can be reduced by employing a non-volatile cache of a data storage subsystem. By utilizing the remote host processor instead of the local subsystem controller to allocate cache and assign destination addresses, the data storage subsystem can devote more processing resources to evaluating secondary events, customizing secondary events to the current system data storage conditions, and separating data write command completion from host notification to free the cache. As a result, data storage performance is optimized.

What is claimed is:

1. A data storage system comprising a host connected to a data storage subsystem, the host comprising a host processor configured to generate a write command and allocate a physical block address cache location for write back data, the data storage subsystem comprising a subsystem controller configured to execute the write command by copying the write back data to a destination memory of the data storage subsystem and verifying the copying of the write back data to the destination memory was successfully completed, the subsystem controller further configured to initiate an evaluation time interval to detect an occurrence of a secondary event unrelated to the execution of the write command while the write back data remains stored in the physical block address cache location, and to signal the host processor that the write command has been successfully completed and the physical block address cache location is free for allocation and receipt of new write back data by the host responsive to detection of the occurrence of the secondary event during the evaluation time interval.

2. The data storage system of claim 1, wherein the physical block address cache location is a non-volatile type of memory.

3. The data storage system of claim 1, wherein the physical block address cache location is a volatile type of memory.

4. The data storage system of claim 1, wherein the secondary event is a data maintenance operation carried out by the subsystem controller upon the destination memory.

5. The data storage system of claim 1, wherein the secondary event comprises an observed rate of incoming write data to the data storage subsystem, and wherein the subsystem controller delays the signaling of the host processor to accommodate the observed rate of incoming write data.

6. The data storage system of claim 1, wherein the secondary event comprises a predicted rate of incoming write data to the data storage subsystem in the near future, and wherein the subsystem controller delays the signaling of the host processor in anticipation of servicing the predicted rate of incoming write data.

7. The data storage system of claim 1, wherein the host is connected to the data storage subsystem via a peripheral component interconnect express (PCIe) bus employing a non-volatile memory express (NVMe) protocol, and the physical block address cache location comprises a command memory buffer (CMB) of the data storage subsystem to which the write back data are directly written by the host via the PCIe bus.

8. A method comprising:
connecting a host to a data storage subsystem, the host comprising a host processor, the data storage subsystem comprising a subsystem controller;
generating write back data at the host;
allocating a physical block address cache location in the data storage subsystem for the write back data with the host processor;
storing the generated write back data in the allocated physical block address cache location;
writing the generated write back data in a non-volatile destination memory as directed by the subsystem controller;
using the subsystem controller to verify successful storage of the write back data to the non-volatile destination memory;
initiating an evaluation time interval;

detecting an occurrence of a secondary event during the evaluation time interval, the secondary event unrelated to the successful verification of the writing of the write back data to the non-volatile destination memory, the write back data remaining in both the physical block address cache location and the non-volatile destination memory during the evaluation time interval; and signaling the host processor that the physical block address cache location is free for receipt of new write back data in response to detection of the secondary event.

9. The method of claim 8, wherein the first secondary event comprises a garbage collection operation that is carried out upon the destination memory after the verification of the write back data in the destination memory and prior to the signaling of the host processor.

10. The method of claim 8, wherein the secondary event comprises a determination that the cache location is less than half full of current write back data and at least a predetermined volume of data is being written to the destination memory.

11. The method of claim 8, wherein the secondary event comprises a determination that the physical block address cache location is more than half full of current write back data and priority data read requests during an I/O deterministic window are predicted.

12. The method of claim 8, wherein the secondary event comprises execution of a set of read refresh operations upon data stored to the destination memory.

13. The method of claim 8, wherein the secondary event is an out-of-band handshake.

14. The method of claim 8, wherein the secondary event is a cache memory of the data storage subsystem having a predetermined volume of current data.

15. The method of claim 8, wherein the secondary event is a cache being more than half full of current write back data to provide greater processing capabilities to service priority data read requests.

16. A method comprising:
generating write back data for a data storage subsystem;
allocating a first physical block address cache location in the data storage subsystem for the write back data with a host processor of a host connected to the data storage subsystem;
storing the generated write back data in the first physical block address cache location;
mirroring the write back data to a second cache location of the data storage subsystem;
writing the write back data in a non-volatile destination memory location as directed by a data storage subsystem controller;
verifying the write back data were successfully written to the non-volatile destination memory location;
waiting for a secondary event with the write back data stored in the first physical block address cache location or the second cache location and the non-volatile destination memory location, the secondary event unrelated to the verification of the successful writing of the write back data to the non-volatile destination memory location; and
signaling the host processor that at least a selected one of the first physical block address cache location or the second cache location is free for new write back data in response to detection of the secondary event.

17. The method of claim 16, wherein the mirroring of data is conducted passively and in response to writing data to the first physical block address cache location.

18. The method of claim 16, wherein the first physical block address cache location is a volatile type of memory, the second cache location is a non-volatile type of memory, and the host processor is located in a host system connected to the data storage subsystem.

19. The method of claim 16, wherein the secondary event is determined in relation to a total amount of cached write back data stored by the data storage subsystem.

20. The method of claim 16, wherein the secondary event is determined in relation to a predicted amount of write or read data that will be processed by the data storage subsystem controller in the near future.

* * * * *